United States Patent [19]

Friedman

[11] Patent Number: 5,534,593
[45] Date of Patent: Jul. 9, 1996

[54] POLYMETHYLPENTENE/POLYPROPYLENE BLEND AND FILM

[75] Inventor: Michael Friedman, Wayne, N.J.

[73] Assignee: Norton Performance Plastics Corporation, Worcester, Mass.

[21] Appl. No.: 447,850

[22] Filed: May 23, 1995

Related U.S. Application Data

[63] Continuation of Ser. No. 275,927, Jul. 15, 1994, abandoned, which is a continuation of Ser. No. 55,238, Apr. 27, 1993, abandoned.

[51] Int. Cl.$^6$ ............................................. C08L 23/12
[52] U.S. Cl. ............................................. 525/240; 525/242
[58] Field of Search .................................. 525/240, 242

[56] References Cited

U.S. PATENT DOCUMENTS

| | | | |
|---|---|---|---|
| 3,793,239 | 2/1974 | Rixon et al. | 260/2.5 |
| 4,471,085 | 9/1984 | Yamamoto et al. | 524/449 |
| 4,546,150 | 10/1985 | Shigemoto | 525/240 |
| 4,886,849 | 12/1989 | Hwo | 524/263 |
| 5,041,491 | 8/1991 | Turke | 524/425 |
| 5,089,309 | 2/1992 | Odate | 428/36.92 |

FOREIGN PATENT DOCUMENTS

| | | |
|---|---|---|
| 2122771 | 12/1971 | Germany. |
| 50-096643 | 7/1975 | Japan. |
| 0098753 | 8/1978 | Japan. |
| 59-176375 | 10/1984 | Japan. |
| 0206620 | 10/1985 | Japan. |
| 91011317 | 2/1991 | Japan. |

*Primary Examiner*—Irina Zemel
*Attorney, Agent, or Firm*—Mary E. Porter

[57] ABSTRACT

The present invention provides a composition comprising a blend of:

(A) from about 90% to about 10% by weight of polymethylpentene, wherein the polymethylpentene has a molecular weight between from about 200,000 to about 700,000, and a melt flow rate between from about 20 grams/10 minutes to about 200 grams/10 minutes;

(B) from about 10% to about 90% by weight of polypropylene, wherein the polypropylene has a molecular weight between from about 150,000 to about 350,000, and a melt flow rate between from about 1 gram/10 minutes to about 10 grams/10 minutes;

whereby the blend of (A) and (B) has improved elongation and improved release properties.

The invention further provides a blend with improved tensile strength, improved elongation, and improved release properties, and a method of producing a article with improved release properties from the blend.

16 Claims, No Drawings

POLYMETHYLPENTENE/POLYPROPYLENE BLEND AND FILM

This application is a continuation of application No. 08/275,927, filed Jul. 15, 1994, now abandoned, which is a continuation of application Ser. No. 08/055,238 filed on Apr. 27, 1993, now abandoned.

FIELD OF THE INVENTION

The invention relates polypropylene/polypropylene blends and their use in release films. The invention is particularly useful in the production of release films, release liners, carriers in composites production using thermosetting polymers (for example epoxy resin) and coatings for paper and polymer liners.

TECHNOLOGY REVIEW

Polymethylpentene (PMP) is a polyolefin with high chemical resistance, good mechanical and electrical characteristics, and high light transparency. The advantages of PMP are very low density (at 0.83 g/cm$^3$ the lightest of all industrial thermoplastics), higher rigidity, tensile modulus, high use temperature, low surface tension and transparency comparable to other polyolefins. PMP is superior to polypropylene at higher temperatures because of its higher melting and softening point. The impact strength of PMP is 2–3 times higher than the impact strength of other thermoplastics with comparable light-transmission characteristics such as polystyrene and acrylics. Thermal and chemical resistance provides the basis for PMP applications including films, filaments, fibers, wire, and cable coating. PMP is also utilized for film and paper coating with good release properties.

Polymethylpentene (PMP), however, has some disadvantages which are also typical for release films made from it. These disadvantages are relatively low tensile strength (2,000–3,000 psi); relatively low elongation at break (60%–120%); higher price; high notch sensitivity and a decreasing release force with aging, especially at high temperatures. In the past there have been a number of attempts to minimize or eliminate these disadvantages of PMP. Primarily, however, these attempts have focused on methods to decrease the price and/or methods to improve the properties of PMP. These methods generally involve blending PMP with other thermoplastic resins and/or by adding fillers.

Polymethylpentene (PMP) has been blended with other thermoplastics resulting in formulations with properties which were comparable to film and sheet made of 100% PMP resin. In spite of the large amount of work based on blending of PMP with other thermoplastics including polypropylene (PP) there is no suggestion of a PMP blend or alloy which allows for a film with high tensile strength and elongation at break and improved release properties (lower initial release force at room temperature if compared to 100% PMP and lower or similar release force after aging at temperatures higher than the room temperature). Further, there is no suggestion based on the properties of polypropylene that the addition of polypropylene (PP) will improve the elongation, tensile strength, and release properties of PMP.

Polymethylpentene (PMP) has satisfactory release characteristics which are determined by measuring the release force needed to peel off an adhesive coated substrate at room temperature (the procedure of measuring the release force will be described below in more detail). The release force is usually in the range from 0.5 to 0.75 lb per inch of the contact length and increases after aging at approximately 51.7° C. (125° F.) over a period 72 hours up to the range from 0.65 to 0.95 lb/in or even higher. At the same time the tensile strength and elongation at break of the above mentioned PMP is relatively low—in the range from 2,300 to 2,500 Psi and from 20% to 120% respectively. Further, the cost of PMP is relatively high.

Polypropylene (PP) films have tensile strength and elongation at break which are typically in the range from 2,500 Psi to 3,750 Psi and from 150% to 450% respectively. The release force of film made of polypropylene is much higher than film made of PMP and typically is in the range from 0.8 lb/in to 1.5 lb/in. This is why PP by itself is not used as a release film, release liner, or a release carrier. The cost of PP in comparison with PMP is relatively low.

It is the object of the present invention to produce a polymethylpentene release film blend (release liner, release coating or carrier) which shows a very low initial (at room temperature) release force, a high tensile strength, a high elongation at break, retains (or even improves) its release characteristics after aging and has a considerably lower cost than release film made of 100% PMP.

SUMMARY OF THE INVENTION

The present invention provides a composition comprising a blend of:

(A) from about 90% to about 10% by weight of polymethylpentene, wherein the polymethylpentene has a molecular weight between from about 200,000 to about 700,000, and a melt flow rate between from about 20 grams/10 minutes to about 200 grams/10 minutes;

(B) from about 10% to about 90% by weight of polypropylene, wherein the polypropylene has a molecular weight between from about 150,000 to about 350,000, and a melt flow rate between from about 1 gram/10 minutes to about 10 grams/10 minutes;

whereby the blend of (A) and (B) has improved elongation and improved release properties.

The invention further provides a blend with improved tensile strength, improved elongation, and improved release properties, and a method of producing a article with improved release properties from the blend.

DETAILED DESCRIPTION OF THE INVENTION

The present invention is directed to a composition. The invention is a blend of component (A) polymethylpentene and component (B) polypropylene. The polymethylpentene of component (A) of the release blend has a molecular weight between from about 200,000 to 700,000. The molecular weight is preferably between from about 250,000 to about 500,000.

The polymethylpentene of Component (A) of the release blend further has a melt flow rate measured at 260° C. and 5 kg (49N) load between from about 20 grams/10 minutes to about 200 grams/10 minutes. The melt flow rate measured at 260° C. and 5 kg (49 N) load is preferably between from about 30 grams/10 minutes to about 200 grams/10 minutes, and more preferably between from about 60 grams/10 minutes to about 200 grams/10 minutes. The melt flow rate is determined using ASTM Standard No. D1238.

In practicing the invention, Component (A) may comprise from about 90% to about 10% by weight of the blend of Components (A) and (B). Preferably, Component (A) comprises from about 90% to about 30% by weight, and moist preferably from about 70% to about 50% by weight of the blend.

The polypropylene of Component (B) of the release blend has a molecular weight between from about 150,000 to 350,000. The molecular weight is preferably between from about 200,000 to about 300,000.

The polypropylene of Component (B) of the release blend further has a melt flow rate measured at 230° C. and 2.16 kg (21.2 N) load between from about 1 grams/10 minutes to about 10 grams/10 minutes. The melt flow rate measured at 230° C. and 2.16 kg (21.2 N) load is preferably between from about 2 grams/10 minutes to about 10 grams/10 minutes, and more preferably between from about 4 grams/10 minutes to about 10 grams/10 minutes. The melt flow rate is determined using ASTM Standard No. D1238.

The polypropylene of Component (B) may have an atactic fraction of less than about 2%. Preferably, the atactic fraction is less than 0.5%. Atactic molecules are a type of polymer molecule in which substituent groups or atoms are arranged randomly above and below the backbone chain of atoms, when the latter are all in the same plane. The atactic fraction for purposes of this invention is that percentage of polypropylene molecules which are atactic in comparison with the total number of polypropylene molecules.

In practicing the invention, Component (B) may comprise from about 10% to about 90% by weight of the blend of Components (A) and (B). Preferably, Component (A) comprises from about 10% to about 70% by weight, and most preferably from about 30% to about 50% by weight of the of the blend.

The relative amounts of Components (A) and (B) may be varied within the defined ranges in order to satisfy the needs of a particular application or the needs of a specific piece of processing equipment. Variation of the components further leads to changes in properties. Examples of these properties include tensile strength modulus, elongation at break, impact resistance, gloss, color and release characteristics. The preceding examples of properties, however, are only given by way of illustration and not by way of limitation.

The properties can be further adjusted by employing one or more additives such as, for example, thermal stabilizers, colorants, antistatic agents, inorganic fillers, release agents, or other additives and processing aids which are well known by those skilled in the art. The preceding examples of additives are, however, only given by way of illustration and not by way of limitation.

Thermal stabilizers such as, for example, tris(2,4-di-t-butylphenyl)phosphate can be added. The preceding example of thermal stabilizers is, however, only given by way of illustration and not by way of limitation.

Colorants may include dyes or pigments. Examples of dyes include but are not limited to azo dyes, anthraquinone dyes, xanthene dyes, azine dyes, fluorescent dyes, others (brilliant sulfoflavine, solvent orange 60, basic triphenylmethane dyes and quinoline yellows), and combinations of these dyes. Examples of pigments include but are not limited to titanium dioxide, iron oxides, cadmiums, chrome yellows, molybdate oranges, chromium oxide greens, iron blue, monoazo pigments, disazo pigments, disazo condensation pigments, quinacridone pigments, dioxanzine violet, vat pigments, perylene pigments, thioindigo pigments, phthalocyanine pigments, tetrachloroisoindolinones and combinations of these pigments can be added. The preceding examples of colorants are, however, only given by way of illustration and not by way of limitation.

Antistatic agents such as, for example, 3-laurel amide propyl(3-methyl ammonium methylsulfate), quaternary ammonium, polyamine resin, quaternized fatty amine condensate, amine condensate, nonyl phenol ethylene oxide, nitrogeneous polymer, and combinations of these can be added. The preceding examples of antistatic agents are, however, only given by way of illustration and not by way of limitation.

Inorganic fillers such as, for example, calcium carbonate, kaolin, talc, alumina trihydrate, glass including glass fibers, glass beads and other glass fillers of various geometry and characteristics, and combinations of these, can be added. The preceding examples of inorganic fillers are, however, only given by way of illustration and not by way of limitation.

Foaming agents such as azodicarbonamide and others can be added. The example of using azodicarbonamide as a foaming agent is only given by way of illustration and not by way of limitation.

Release agents such as, for example, diethylene glycol monostearate, hydrogenated castor oil, stearic acid, oleic acid, zinc stearate, calcium stearate ethylene bis(stearamide), oleyl palmitamide, microcrystalline wax, paraffin wax, carnauba wax, spermaceti wax, cellophane, cellulose acetate, sodium alginate, and combinations of these can be added. The preceding examples of release agents are, however, only given by way of illustration and not by way of limitation.

These additives preferably may comprise from between about 0.05% to about 10% by weight of the blend of Component (A), Component (B) and the additives. More preferably, the additives comprise from between 2.0% to about 8.0% by weight, and most preferably from between about 3.5% to about 5.5% by weight of the of the blend of Component (A), Component (B) and the additives.

The blend can be used to form articles for calendering, casting, embossing, extrusion, forming, foaming, laminating, machining, molding, packaging and labeling, transference of materials, protection of processing equipment, pressure-sensitive tape or label release, and rubber processing. The blend can also be used in the production of release films, release liners, carriers in composites producing using thermosetting polymers, and coatings for paper, polymer liners and foams. The preceding examples of uses for articles made from these blends are, however, only given by way of illustration and not by way of limitation.

The processing of the blend of Components (A) and (B) or Component (A), Component (B) and additive(s) can be accomplished by mixing the Components with or without the additives along with the application of heat. The mixing of the Components with or without the additives may take place before, during, or after the application of heat. This can be accomplished for example by extrusion or any other means known by those skilled in the art. The preceding processing example of extrusion is, however, only given by way of illustration and not by way of limitation.

The processing temperatures required for the blend are affected by many factors including pressure, time at temperature, whether the heat is applied before, during, or after mixing, and the degree of mixing. Depending on the processing technique used, the blend can be formed into pellets or other shapes for further processing or can be directly formed into the release article desired. The preferred method of processing is to form pellets by the heating and mixing simultaneously of the polymethylpentene of Component (A) with the polypropylene of Component (B).

Further processing of the pellets made from the blend may be used to form an article. An example of further processing is extrusion of a release film. The pellets formed by heating and mixing the blend of Component (A) polymethylpentene and Component (B) polypropylene may be formed by an extruder into a film by means known to those skilled in the art. The film can be extruded preferably at temperatures between from about 200° C. to about 320° C., more preferably at temperatures between from about 220° C. to about 280° C., and most preferably at temperatures between from about 230° C. to about 260° C. The preceding example of extrusion of a release film is only given by way of illustration and not by way of limitation.

The properties for release articles made from the blend of Components (A) and (B) or the blend of Component (A), Component (B) and additive(s) show unexpected improvements in elongation, tensile strength and release. The elongation is measured using ASTM Testing Standard No. D882. The elongation for film articles is preferably greater than about 250%, more preferably greater than about 500%, and most preferably greater than about 800%.

The tensile strength is measured using ASTM Testing Standard No. D882. The tensile strength for film articles is improved for the polymethylpentene/polypropylene blends. Preferably the tensile strength is greater than about 3000 psi.

The release properties for blended film articles were improved and unexpected over the release properties of polymethylpentene, polypropylene and blends of Component (A) and Component (B) with a melt flow rate(s), atactic fraction and molecular weight ($M_w$) outside the scope of the invention. The improvment in release properties was measured by a decrease in the release load of blended film products by a technique which is described later in the Example section. The release load is preferably less than about 0.60 lb/in, and more preferably less than about 0.4 lb/in.

In the invention, the release load is reduced preferably by about 100% over a similar polypropylene film samples and by about 50% over similar polymethylpentene film samples, more preferably by about 150% over similar polypropylene film samples and about 75% over similar polymethylpentene film samples, and most preferably by about 200% over similar polypropylene film samples and about 100% over similar polymethylpentene film samples.

After aging, the blended film samples in general retain their improved release characteristics, while the polymethylpentene's and polypropylene's release characteristics degrade, resulting in an increase in release load. After aging the film samples, the release load drops further preferably by about 60% over a similar polypropylene film sample and about 25% over a similar polymethylpentene film sample, more preferably by about 70% over a similar polypropylene film sample and about 40% over a similar polymethylpentene sample, and most preferably by about 80% over a similar polypropylene film sample and about 60% over a similar polymethylpentene sample.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Examples of film were manufactured from polymethylpentene(PMP)/polypropylene(PP) blends by mixing the melts of these two basic thermoplastic resins. All formulations contained the thermostabilizer phenolic antioxidant tris(2,4-di-t-butylphenyl)phosphite with the brand name CYANOX 2777 in amount of 0.15% and the antistatic agent (3-lauramidopropyl)trimethylammonium-methyl-sulfate with the brand name CYASTIC in amount of 0.10%. The thermostabilizer and antistatic agent are available from American Cyanamid Corporation. All formulations including polymethylpentene, polypropylene and the above mentioned additives, were premixed in a dry high speed (turbo) mixer at 300 rpm for 20 minutes, then blended or compounded in a twin-screw extruder (Model ZSK-30 produced by Werner and Pfleiderer Co.). All compounds were extruded into strings, these strings then being pelletized into pellets of a standard size.

The typical conditions of melt compounding and pelletization are given below (MFR—melt flow rate measured and calculated for polymethylpentene in grams per 10 minutes at 260° C. under load of 49N using ASTM Standard D1238). With all formulations consisting up to 30% by weight polymethylpentene with melt flow rates higher than 100 g/10 minutes, the temperatures of zones 1–5 of the twin screw extruder barrel were 160°, 174°, 210°, 227° and 229° C. respectfully, and the temperature of the die was between 229° and 232° C. With all formulations consisting up to 30% by weight polymethylpentene with melt flow rates lower than 100 g/10 minutes, the temperatures of the zones 1–5 of the twin screw extruder barrel were 160°, 177°, 221°, 227°, 232° and 235° C. respectfully, and the temperature of the die was between 238° and 241° C. With all formulations consisting of more than 30% by weight polymethylpentene, the temperatures of the zones 1–5 of the twin screw extruder barrel were 160°, 188°, 229°, 232°, 238° and 243° C. respectfully, and the temperature of the die was between 241° and 243° C. The screw speed in compounding and pellitization was approximately the same (75–76 rpm).

All compounded formulations (blends) in the form of pellets were processed into films using two casting film lines based on single-screw extruders. The pilot line was based on an extruder with a screw 2" in diameter and the manufacturing line was based on an extruder with a screw 3.5" in diameter. Both screws have a relative length of 24 diameters. Both the pilot and manufacturing lines were equipped with flat extrusion dies similar in design, but different in the width of the extruded film: the pilot plant has an 18" die width, while the manufacturing plant has a 54" die width.

The films were processed under four conditions. Process condition 1 involved using the pilot line for processing formulations with a polymethylpentene content of up to 30% by weight. The screw speed was 17 RPM; the temperature of the top casting roll 93°–110° C. the temperatures of the extruder barrel's zones 1–6 were 163°, 118°, 204°, 218°, 204° and 229° C. respectfully; the temperatures of zones 1–5 of the film die were 232°, 229°, 227°, 229° and 232° C. respectfully; and the temperature of the lips of the film die was 232° C.

Process condition 2 involved using the pilot film line for processing formulations with a polymethylpentene content greater than 30% by weight. The screw speed was 17 rpm; the temperature of the top casting roll was between 93–110° C.; the temperatures of the extruder barrel's zones 1–6 were 171°, 182°, 218°, 227°, 232° and 238° C. respectfully; the temperatures of zones 1–5 of the film die were 241°, 235°, 232°, 235° and 241° C. respectfully; and the temperature of the lips of the film die was 243° C.

Process condition 3 involved using the manufacturing line for processing formulations with a polymethylpentene content up to 30% by weight. The screw speed was 10 rmp; the temperature of the top casting roll was between 99–116° C.; the temperatures of the extruder barrel's zones 1–6 were 179°, 196°, 224°, 241°, 246° and 249° C. respectfully; the temperatures of zones 1–5 of the film die were 243°, 241°, 235°, 241° and 243° C. respectfully; and the temperature of the lips of the film die was 243° C.

Process condition 4 involved using the manufacturing line for processing formulations with a polymethylpentene content greater than 30% by weight. The screw speed was 12 rpm; the temperature of the top casting roll was between 102°–118° C.; the temperatures of the extruder barrel's zones 1–6 were 182°, 199°, 227°, 241°, 249° and 252° C. respectfully; the temperatures of zones 1–5 of the film die were 246°, 243°, 241°, 249° and 252 ° C. respectfully; and the temperature of the lips of the film die was 246° C.

The properties of films were evaluated for all formulations (the comparison of the properties is given below in the following three tables). Each film sample was tested to determine the tensile strength and elongation at break, initial release force at the room temperature, and the release force after aging of the films at 51.7° C. (125° F.) during 72 hours. The mechanical properties of film were measured using ASTM Standard D882.

To determine the release properties, samples of film or liner to be tested were cut out using a standard device for cutting samples to 1 +/– 1/32" width and 10 inches long representing different parts of the film roll: the front, center, and back of each finished roll tested (6 samples of each area). The sample was applied to a pre-cast sheet (substrate) and placed in the tensile test machine capable of operating at 40 inches per minute cross-head speed and able to measure using 1 pound full scale load range. The Instron tensile test machine (model No. 1445) at 40 in/min cross-head speed was used; the recorder was set to record on a 1 pound full scale range. The film/liner being tested was clamped in the top grip of the machine and the preset sheet in the bottom grip. While moving the cross-head of the machine the film liner and the substrate were let to separate at natural, uninfluenced angle.

Average readings were taken and all steps were repeated times for each sample. Any spikes in release were marked and any assignable causes such as air pockets were noted. All tests of the release characteristics were performed at room temperature and then repeated after aging the samples at 51.7 ° C. (125° F.) during 72 hours.

The results for all samples are given in the following table and discussed below (in the table MFR in grams per 10 min. was measured for polymethylpentene at 260° C. under the load of 49N and for polypropylene at 230° C. under the load of 21.2N).

Example 1

Polymethylpentene

Samples of films were produced using polymethylpentene to determine the physical properties of a pure polymethylpentene film including elongation and release. The following Table summarizes the results.

| 100% PMP | | Properties of film Tensile Elongation, Release | | |
|---|---|---|---|---|
| Melt Flow Rate (g/10 minutes) | Processing Condition | Strength PSI | % | Force, lb/in initial/aged |
| 10 | 2 | 3000 | 120 | 0.47/0.57 |
| 15 | 2 | 2900 | 100 | 0.51/0.59 |
| 20 | 2 | 2850 | 90 | 0.51/0.63 |
| 56 | 2 | 2670 | 45 | 0.55/0.66 |
| 94 | 2 | 2640 | 35 | 0.57/0.68 |
| 20 | 2* | 3000 | 20 | 0.54/0.65 |
| 26 | 4 | 3150 | 22 | 0.52/0.65 |
| 200 | 4 | 2870 | 16 | 0.63/0.72 |

*-The film was stretched in machine direction.

Example 2

Polypropylene

Samples of films were produced using polypropylene to determine the physical properties of a pure polypropylene film including elongation and release. The following Table summarizes the results.

| 100% PP | | Properties of film Tensile Elongation, Release | | |
|---|---|---|---|---|
| Melt Flow Rate (g/10 minutes) | Processing Condition | Strength PSI | % | Force, lb/in initial/aged |
| 0.22 | 1 | 4000 | 305 | 0.96/1.17 |
| 2.0 | 1 | 3870 | 280 | 0.83/1.25 |
| 1.0 | 1 | 3720 | 250 | 0.94/1.30 |
| 2.0 | 3* | 6100 | 90 | 1.07/1.18 |
| 4.0 | 4* | 7700 | 70 | 1.16/1.32 |
| 7.5 | 3* | 4250 | 100 | 0.87/1.03 |
| 10.3 | 4* | 4300 | 85 | 1.05/1.26 |
| 13.2 | 4 | 7200 | 40 | 1.02/1.18 |
| 20.5 | 3 | 4550 | 90 | 0.98/1.21 |

*-The films were stretched in machine direction.

Example 3

Polymethylpentene/Polypropylene Blends

Samples of films were produced using various polymethylpentene/polypropylene blends to determine the physical properties of the various blends of film including elongation and release. The following Table summarizes the results.

| Formulation and | | Properties of film Tensile Elongation, Release | | |
|---|---|---|---|---|
| Melt Flow Rate (g/10 minutes) | Processing Condition | Strength 1000 PSI | % | Force, lb/in initial/aged |
| PMP,MFR = 10.0: 95% PP,MFR = 0.5: 5% | 2 | 3000 | 100 | 0.74/0.87 |
| PMP,MFR = 10.0: 80% | 2 | 2550 | 120 | 1.01/1.34 |

-continued

| Formulation and Melt Flow Rate (g/10 minutes) | Processing Condition | Properties of film Tensile Elongation, Release | | |
|---|---|---|---|---|
| | | Strength 1000 PSI | % | Force, lb/in initial/aged |
| PP,MFR = 4.0: 20% PMP,MFR = 10.0: 70% | 1 | 3600 | 350 | 1.09/1.39 |
| PP,MFR = 10.0: 30% PMP,MFR = 20.0: 95% | 2 | 3460 | 200 | 0.77/1.09 |
| PP,MFR = 0.5: 5% PMP,MFR = 20.0: 70% | 2 | 3250 | 180 | 0.69/0.94 |
| PP,MFR = 0.5: 30% PMP,MFR = 20.0: 50% | 2 | 2950 | 155 | 0.63/0.92 |
| PP,MFR = 0.5: 50% PMP,MFR = 20.0: 90% | 2 | 3550 | 500 | 0.50/0.48 |
| PP,MFR = 1.0: 10% PMP,MFR = 20.0: 70% | 2 | 3950 | 560 | 0.47/0.42 |
| PP,MFR = 1.0: 30% PMP,MFR = 20.0: 50% | 2 | 4080 | 560 | 0.37/0.33 |
| PP,MFR = 4.0: 50% PMP,MFR = 20.0: 30% | 2 | 4120 | 600 | 0.32/0.28 |
| PP,MFR = 4.0: 70% PMP,MFR = 20.0: 10% | 1 | 3650 | 450 | 0.26/0.24 |
| PP,MFR = 4.0: 90% PMP,MFR = 96.0: 90% | 2 | 3850 | 600 | 0.24/0.21 |
| PP,MFR = 7.0: 10% PMP,MFR = 96.0: 70% | 2 | 3900 | 650 | 0.22/0.19 |
| PP,MFR = 7.0: 30% PMP,MFR = 96.0: 30% | 1 | 3800 | 800 | 0.32/0.24 |
| PP,MFR = 7.0: 70% PMP,MFR = 96.0: 10% | 3 | 4100 | 900 | 0.28/0.23 |
| PP,MFR = 7.0: 90% PMP,MFR = 196.0: 95% | 2 | 2450 | 85 | 0.72/0.89 |
| PP,MFR = 0.5: 5% PMP,MFR = 196.0: 95% | 2 | 2480 | 70 | 0.61/0.68 |
| PP,MFR = 1.0; 5% PMP,MFR = 196.0; 90% | 4 | 2750 | 350 | 0.42/0.36 |
| PP,MFR = 1.0; 10% PMP,MFR = 196.0; 70% | 2 | 2750 | 350 | 0.39/0.30 |
| PP,MFR = 1.0; 30% PMP,MFR = 196.0; 50% | 2 | 2800 | 400 | 0.37/0.33 |
| PP,MFR = 1.0; 50% PMP,MFR = 196.0; 30% | 1 | 3250 | 500 | 0.36/0.30 |
| PP,MFR = 1.0; 70% PMP,MFR = 196.0; 10% | 3 | 3550 | 450 | 0.38/0.34 |
| PP,MFR = 1.0; 90% PMP,MFR = 196.0; 95% | 2 | 2100 | 160 | 0.67/0.79 |
| PP,MFR = 7.2; 5% PMP,MFR = 196.0; 90% | 2 | 3480 | 250 | 0.43/0.35 |
| PP,MFR = 7.2; 10% PMP,MFR = 196.0; 70% | 2 | 4250 | 760 | 0.34/0.27 |
| PP,MFR = 7.2; 30% PMP,MFR = 196.0; 50% | 4 | 4300 | 850 | 0.29/0.25 |
| PP,MFR = 9.95; 50% PMP,MFR = 196.0; 50% | 1 | 4650 | 900 | 0.24/0.19 |
| PP,MFR = 9.95; 50% PMP,MFR = 196.0; 30% | 1 | 4350 | 730 | 0.29/0.23 |
| PP,MFR = 9.95; 70% PMP,MFR = 196.0; 9% | 1 | 4150 | 320 | 0.56/0.59 |
| PP,MFR = 9.95; 91% PMP,MFR = 196.0; 11% | 3 | 4350 | 435 | 0.37/0.31 |
| PP,MFR = 9.95; 89% PMP,MFR = 196.0; 50% | 2 | 3000 | 260 | 0.59/0.73 |
| PP,MFR = 12.7; 7.50% PMP,MFR = 207.6; 50% | 2 | 2400 | 190 | 0.74/0.89 |
| PP,MFR = 7.0; 50% PMP,MFR = 207.6; 30% | 2 | 2750 | 200 | 0.84/0.96 |
| PP,MFR = 7.0; 70% PMP,MFR = 207.6; 10% | 3 | 3100 | 240 | 0.92/1.04 |
| PP,MFR = 7.0; 90% PMP,MFR = 86.9; 70% | 1 | 4540 | 950 | 0.24/0.19 |
| PP,MFR = 4.7; 30% | | | | |

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A release film comprising a blend of:
   (A) from about 90% to about 10% by weight of polymethylpentene, wherein the polymethylpentene has a molecular weight from about 200,000 to about 700,000, and a melt flow rate between from about 30 grams/10 minutes to about 200 grams/10 minutes; and
   (B) from about 10% to about 90% by weight of polypropylene, wherein the polypropylene has a weight average molecular weight from about 150,000 to about 350,000, and a melt flow rate between from about 1 gram/10 minutes to about 10 grams/10 minutes;
   whereby the blend of (A) and (B) has an elongation greater than about 250% and a release load less than about 0.60 lb/in.

2. The film in claim 1, wherein the polypropylene has an atactic fraction of less than about 2%.

3. The film in claim 1, including at least one processing aid.

4. The film in claim 1, including at least one additive.

5. The film in claim 1, wherein the composition of (A) and (B) has a tensile strength greater than about 3000 psi.

6. A process for producing a release film comprising the step of:
   extruding a film from a composition comprising a blend of:
   (A) from about 90% to about 10% by weight of polymethylpentene, wherein the polymethylpentene has a weight average molecular weight from about 200,000 to about 700,000, and a melt flow rate between from about 30 grams/10 minutes to about 200 grams/10 minutes; and
   (B) from about 10% to about 90% by weight of polypropylene, wherein the polypropylene has a weight average molecular weight from about 150,000 to about 350,000, and a melt flow rate between from about 1 gram/10 minutes to about 10 grams/10 minutes;
   whereby the blend of (A) and (B) has an elongation greater than about 250% and a release load less than about 0.60 lb/in.

7. The process in claim 6, wherein the polypropylene has an atactic fraction of less than about 2%.

8. The process in claim 6, at least one processing aid.

9. The process in claim 6, including at least one additive.

10. The process in claim 6, wherein the composition of (A) and (B) has a tensile strength greater than about 3000 psi.

11. The film in claim 1, wherein the melt flow rate of the polymethylpentene is from about 60 to about 200 grams/10 minutes.

12. The film in claim 11, wherein the melt flow rate of the polypropylene is from about 2 to about 10 grams/10 minutes.

13. The film in claim 12, wherein the melt flow rate of the polypropylene is from about 4 to about 10 grams/10 minutes.

14. The process of claim 6, wherein the melt flow rate of the polymethylpentene is from about 60 to about 200 grams/10 minutes.

15. The process of claim 14, wherein the melt flow rate of the polypropylene is from about 2 to about 10 grams/10 minutes.

16. The process of claim 15, wherein the melt flow rate of the polypropylene is from about 4 to about 10 grams/10 minutes.

* * * * *